United States Patent [19]

Orii

[11] Patent Number: 5,057,757
[45] Date of Patent: Oct. 15, 1991

[54] DC MOTOR CONTROL IN ELECTRONIC SEWING MACHINE

[75] Inventor: Akira Orii, Hachioji, Japan

[73] Assignee: Janome Sewing Machine Industry Co., Ltd., Tokyo, Japan

[21] Appl. No.: 495,832

[22] Filed: Mar. 19, 1990

[30] Foreign Application Priority Data

Mar. 17, 1989 [JP] Japan .................................. 1-63523

[51] Int. Cl.$^5$ ........................ H02P 5/06; D05B 69/26
[52] U.S. Cl. .................................... 318/599; 318/269; 112/275; 112/277; 364/513
[58] Field of Search ................................ 318/560–636, 318/269, 376; 388/822, 819, 820, 814, 815, 826, 817; 112/121.11, 121.12, 121.29, 103, 275, 272, 274, 277, 445, 447, 453, 454, 455, 457, 458; 364/513, 550, 554, 164, 184, 148, 130; 307/201, 494

[56] References Cited

U.S. PATENT DOCUMENTS

| | | | |
|---|---|---|---|
| 4,384,241 | 5/1983 | Stillhard | 388/815 X |
| 4,545,314 | 10/1985 | Fujikawa | 112/275 |
| 4,628,434 | 12/1986 | Tashiro et al. | 364/513 X |
| 4,628,435 | 12/1986 | Tashiro et al. | 364/468 X |
| 4,673,851 | 6/1987 | Disser | 318/599 X |
| 4,691,653 | 9/1987 | Neki et al. | 112/275 |
| 4,692,676 | 9/1987 | Dohi et al. | 318/269 |
| 4,738,211 | 4/1988 | Nakamara et al. | 112/277 |
| 4,749,923 | 6/1988 | Chieng | 318/269 |
| 4,749,927 | 6/1988 | Rodal et al. | 318/599 |
| 4,763,052 | 8/1988 | Lundin et al. | 318/599 X |
| 4,777,585 | 10/1988 | Kokawa et al. | 364/513 X |
| 4,791,344 | 12/1988 | Yoshida et al. | 318/567 |
| 4,839,823 | 6/1989 | Matsumoto | 364/513 |
| 4,842,342 | 6/1989 | Takahashi et al. | 364/424.01 |
| 4,864,490 | 9/1989 | Nomoto et al. | 364/162 X |

Primary Examiner—Paul Ip
Attorney, Agent, or Firm—Dann, Dorfman, Herrell and Skillman

[57] ABSTRACT

A load of an electronic sewing machine is self-diagnosed by a control system to cause a DC motor to be operated under control to drive upper and lower shafts of the sewing machine. The control system includes an evaluating device to which a voltage value applied to the DC motor and a rotating speed of the DC motor, both detected, are inputted for determining a current value supplied to the DC motor and a power loss of the DC motor. These data are supplied to a fuzzy theory applying device for estimating if the power loss of the DC motor exceeds a rated value by application of a prescribed fuzzy rule. A control command signal representing an amount of the excessive power loss is outputted from the fuzzy theory applying device to the DC motor for the control of the applied voltage. No need to directly measure the current value, and therefore no need to provide a current detecting resistor in a control circuit.

1 Claim, 4 Drawing Sheets

1

DC MOTOR CONTROL IN ELECTRONIC SEWING MACHINE

BACKGROUND OF THE INVENTION

1. Filed of the Invention

This invention relates to an electronic sewing machine provided with an improved control system for controlling a DC motor employed for driving upper and lower shaft of the sewing machine. The control system will serve self-examination of a load applied to the sewing machine.

2. Description of the Prior Art

It has been recognized necessary that a loaded torque applied to an electronic sewing machine be within a predetermined reference range. The loaded torque may be tested on the manufacturing line of the sewing machine in such manner that a current value applied to the sewing machine is measured to determine wether the sewing machine is operating with a rated output. In case the applied current exceeds a predetermined limit, the sewing machine should be returned to a preceding step on the manufacturing line and re-assembled and re-tested.

FIG. 5 shows an example of prior art electronic circuits mounted within the sewing machine for self-diagonosis of the sewing machine load. In this circuit, a volume VR1 of a controller is connected to a power source Vcc whereby a voltage value which is controlled and changed depending upon an operating amount of the controller will be applied via a filter consisting of a resistor R1 and a capacitor C1 to an analog-digital converting terminal A/D1 of a one-tip control processing unit (hereinafter referred to as IC2). A pulse-width-modulation (PWM) signal which is corresponding to the voltage value thus determined will be outputted from IC2 for the control of DC motor M which drives the sewing machine. To a reset terminal of IC2 is connected an integrated circuit (IC1) for detecting every rise and fall of the power source Vcc to initialize IC2. The motor M is connected between another power source Vb and a drain of a power MOS-FET (FET1). In parallel with the motor M is connected a free wheel diode D1.

The resistor R5 is connected to a source of FET1 for detecting the current value input to the motor M. A signal representing a voltage which is in turn corresponding to the current value detected by the resistor R5 is supplied therefrom, via a filter consisting of a resistor R6 and a capacitor C3, to an analog-digital converting terminal A/D3 of IC2. There is provided a diode D2 for preventing an excessive voltage from being inputted to the terminal A/D3. The PWM signal outputted from IC2 is supplied via a gate IC3 and a gate protecting resistor R4 to a gate of FET1.

A sensor 10 is provided for detecting a rotating speed of the motor and supplying a detection signal toward a port P1 of IC2. The sensor 10 may comprise, as known, a disc plate provided with a slit and secured to the sewing machine upper shaft or a main drive shaft and a photo-interrupter device cooperating with the slitted disc to detect a rotating speed of the shaft, thereby detecting the rotating speed of the motor M.

There are also provided a potential divider consisting of two resistors R2 and R3 for detecting a voltage supplied from the motor drive power source Vb. A divided voltage obtained at a connecting point between these resistors R2 and R3 should be set to a value which does not exceed 5 V, a voltage value supplied from the control power source Vcc, and which is supplied to the terminal A/D2 of IC2. A capacitor C2 serves as a filter for the divided voltage value.

With the prior art system shown in FIG. 5, the current value input to the sewing machine motor M can be detected by the resistor R5. However, when a current flow is supplied to the resistor R5 which is connected in series with the motor M, a source potential is increased so that a gate voltage is relatively decreased, thereby making it impossible to drive FET1. To cope with this problem, it has been necessary to provide another power source Va having a voltage value, e.g. 12 V which is substantially higher than 5 V of the control power source Vcc, to be supplied to the gate of FET1. An additional problem that the prior art has incurred is that the current detecting resistor R5 should be of a considerably great degree of capacity. Supposing the resistor R5 will detect a voltage value of about 1V when the sewing machine is driving with a rated current of the DC motor which is determined to be about 1A, the resistor R5 will have a resistance of 1Ω. However, under the locked condition of the sewing machine, the resistor R5 would receive an overcurrent of at least 10A, resulting in heat generatation of $(10A)^2 \times (1\Omega) = 100$ W or more. In an actual system, there is provided a safe guard means for cutting off the electricity supply to the motor in a while responsive to detection of the locked condition of the sewing machine so that a capacity of the resistor R5 may be decreased to the order of a fraction of 100 W. Even so, the current detecting resistor R5 has still been required to have a considerable capacity.

SUMMARY OF THE INVENTION

It is therefore an object of this invention to provide an improved DC motor control system capable of self-examining a load applied to an electronic sewing machine, with the disadvantages and defects of the prior art system being eliminated.

According to an aspect of this invention there is provided a control system for controlling a DC motor employed in an electronic sewing machine for driving upper and lower shafts, which comprises means for evaluating a voltage applied to the DC motor and a rotating speed of the DC motor to output an evaluation signal; and means for applying said evaluation signal to predetermined fuzzy rule to determine any DC motor power loss in excess of a rated power loss and display means for quantitatively representing such excess power losses.

This invention has been prepared by practical application of the known fuzzy theory which was proposed originally by Lotfi A. Zadeh, Professor of California Univ. in 1964 for dealing with a set of ambiguous conceptions or "fuzzy set". Fuzzy set is defined by a specific "membership function" to lead out a "membership value" ranging between 0 and 1.

BRIEF DESCRIPTION OF THE DRAWINGS

Further objects and advantages of this invention can be fully understood from the following detailed description when read in conjunction with the accompanying drawings in which.

DETAILED DESCRIPTION OF THE EMBODIMENT

Figure 1:
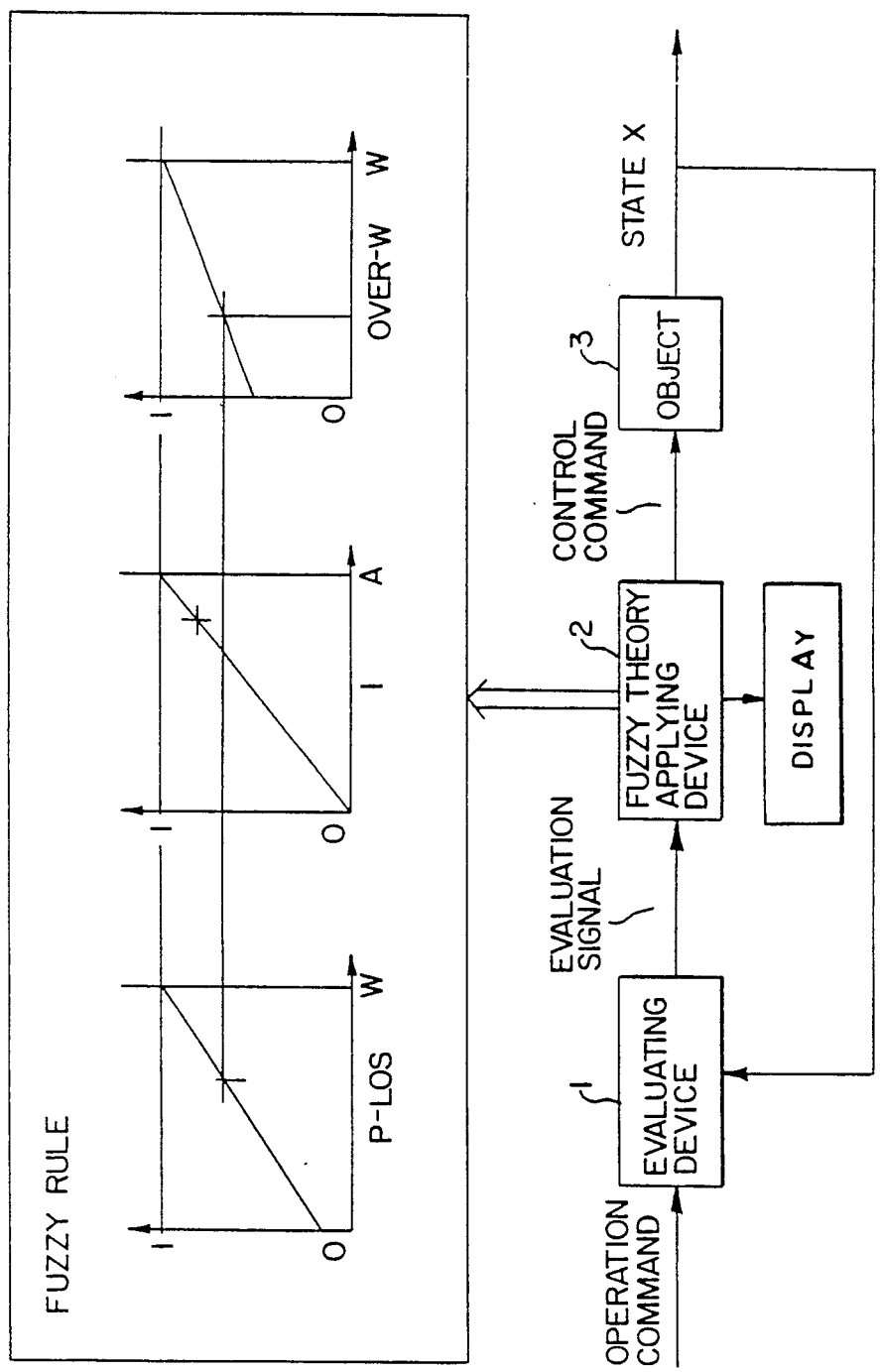
FIG. 1 is a block diagram showing a DC motor control system embodying the invention.

Specifically referring to FIG. 1, the DC motor control system in an electronic sewing machine includes an evaluator 1 which become operable responsive to an operation command signal and is adapted to receive status data signal representing a state X of an object 3 to be controlled. In this instance, the control object 3 is a DC motor employed for driving upper and lower shafts of the sewing machine and the state X comprises a voltage applied to the DC motor and a rotating speed thereof, which are respectively detected by corresponding detection devices such as a voltmeter for the former and a photo-sensor device (which may be of a type described in connection with the sensor 10 in FIG. 5) for the latter. With these data, the evaluator 1 will be operated to determine a power loss of the DC motor and a current flowing through the DC motor, which are included in an evaluation signal to be outputted therefrom to a fuzzy theory applying device 2.

The fuzzy theory applying device 2 is operated in response to the evaluation signal to surmise if the DC motor provides the power loss in excess of a rated loss, in accordance with a prescribed fuzzy rule. The surmised result is outputted from the device 2 as a control command signal to the DC motor 3 which is thus controlled to lower the power loss below the rated loss, if it is the case. The surmised result is also represented in a display section (not shown) in the sewing machine housing.

Membership functions of the fuzzy rule to be applied in operation of the fuzzy theory applying device 2 are graphed also in FIG. 2, which will now be described in detail. The actual power loss (P-LOS) in the DC motor 3 which is calculated by the evaluator 1 and included in the evaluation signal outputted therefrom toward the device 2 is plotted on the abscissa of a first membership function, according to which a first membership value ranging between 0 and 1 may be obtained on the ordinate. The actual current value (I) flowing through the DC motor which is also included in the evaluation signal is plotted on the abscissa of a second membership function to lead out a second membership value in a range from 0 to 1 on the ordinate. In accordance with lower one of the membership values thus obtained, a third membership function is applied for determing if the power loss of the DC motor exceeds the rated loss. Where there exists the excessive power loss, this excessive value OVER-W is quantitatively represented in the display. In the example shown in FIG. 1, if lower one of the first and second membership values is below 0.5, application of the third membership function estimates that there is no excessive power loss so that no control is applied to the DC motor 3.

Figure 3:
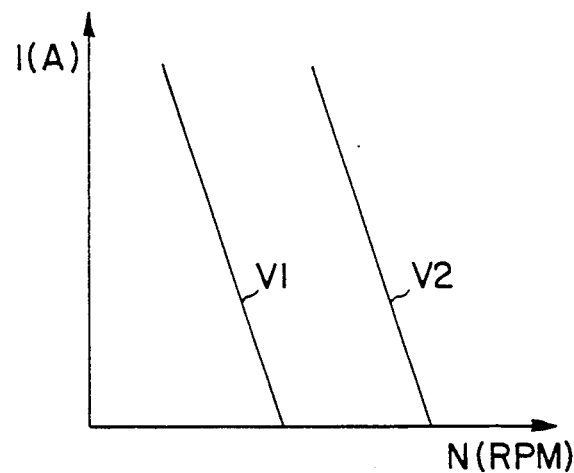
FIG. 3 is a graph showing characteristics of a DC motor to be controlled in the system.

Here, the characteristics of the DC motor will be explained in reference to FIG. 3. A voltage value applied to the DC motor may be obtained from the following equation (1):

$$V = KN\Phi + RAI \quad (1)$$

where V represents a voltage, K a constant, N a rotating speed, RA a resistance of an armature, I a current and $\Phi$ a magnetic flux.

Since the magnetic flux $\Phi$ of the DC motor is substantially constant and the armature resistance RA would not be changed greatly as far as in the same series of the DC motors, variables in the equation (1) consist of the rotating speed N of the DC motor, which is dependent upon the sewing machine load, and the current I. From the equation (1) is derived the following equation (2) which means that the current I can be determined in accordance with the motor rotating speed N and the applied voltage V:

$$I = (V - KN\Phi)/RA \quad (2)$$

Meanwhile, the power loss P-LOS can be determined by the following equation (3):

$$P\text{-}LOS = I^2 RA + W1 \quad (3)$$

where W1 represents an inherent power loss of the motor which can be regarded as a constant.

From these equations (2) and (3), the evaluator 1 will determine the current I and the power loss P-LOS to output the evaluation signal toward the fuzzy theory applying device 2, and will be used in application of the fuzzy rule to determine the first and second membership values.

Figure 2:
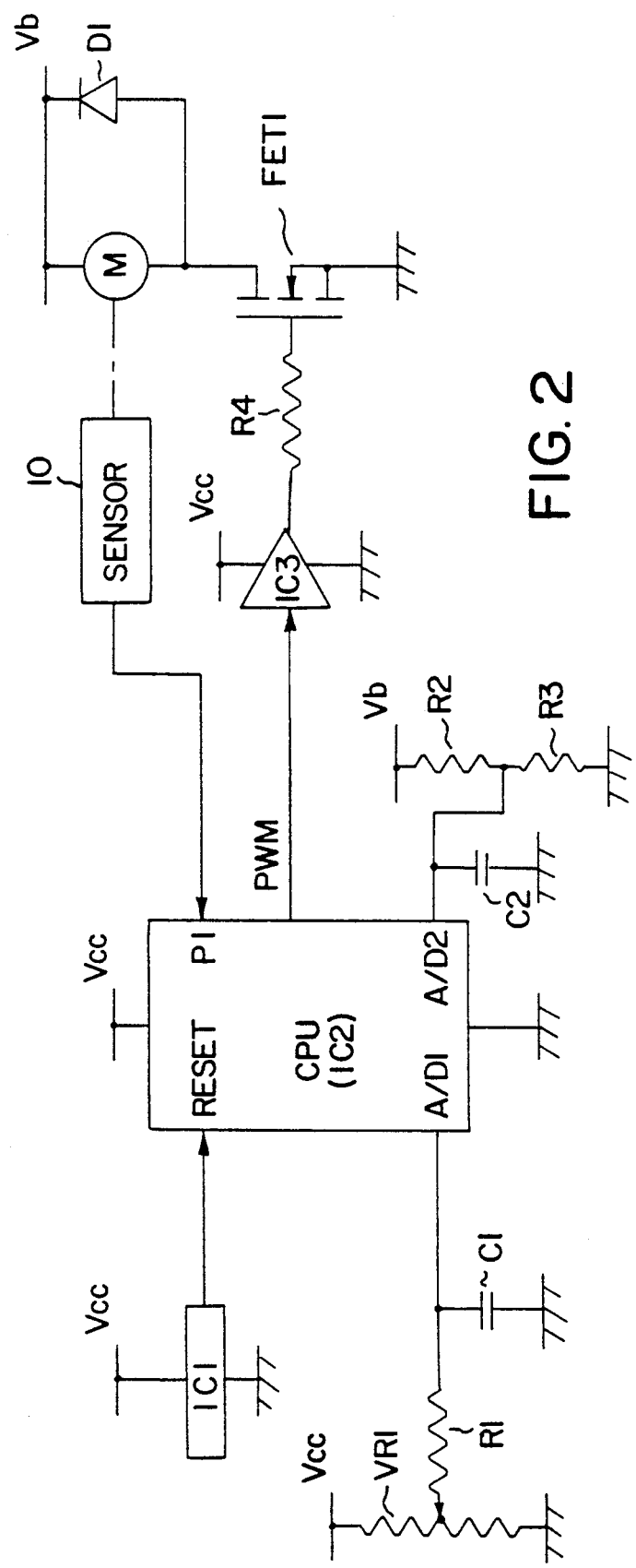
FIG. 2 is a block diagram showing a circuit arrangement employed for the control system.
Figure 5:
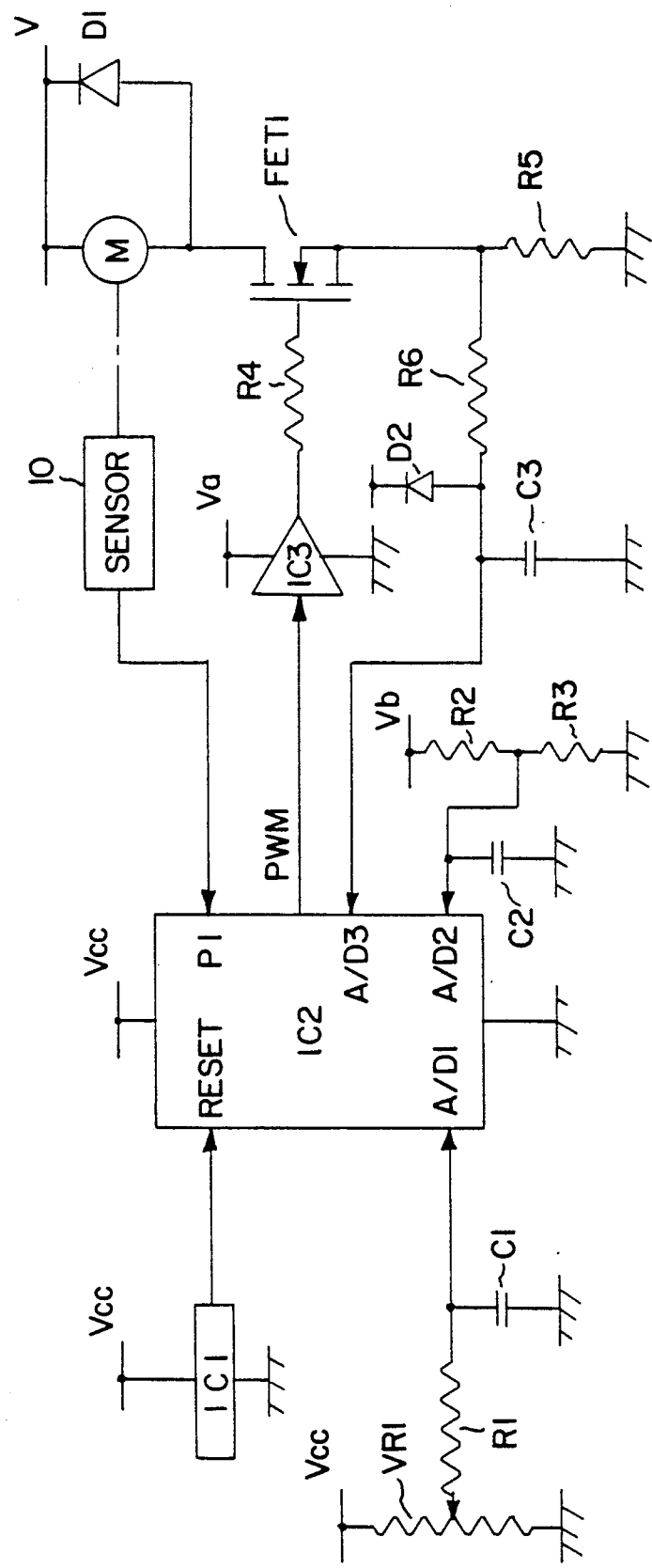
FIG. 5 is a block diagram showing a circuit arrangement of the prior art control system.

An electric circuit used for the system is shown in FIG. 2 in which the elements and components identical to those used in the prior art circuit shown in FIG. 5 are accompanied by the same references and detailed explanation thereof is omitted for simplicity. As known from comparison between these two circuits in FIGS. 2 and 5, there is no need for the circuit according to the invention to provide the resistor R5 of low resistance and high capacity (in FIG. 5) which has been required for detecting the current flowing into the DC motor M. The filtering resistor R6 and capacitor C3 and the input protecting diode D2 can also be omitted from the prior art circuit. Moreover, since the resistor R5 is not connected in series with the motor M in the present circuit, the power MOS-FET (FET1) can be driven with a considerably lower voltage and therefore by the control power source Vcc of 5V, for example. There is no need to provide a separate power source such as Va of 12V (FIG. 5) for driving the FET1. Such differences will improve space availability in the sewing machine and reduce manufacturing costs to a great extent.

Figure 4:
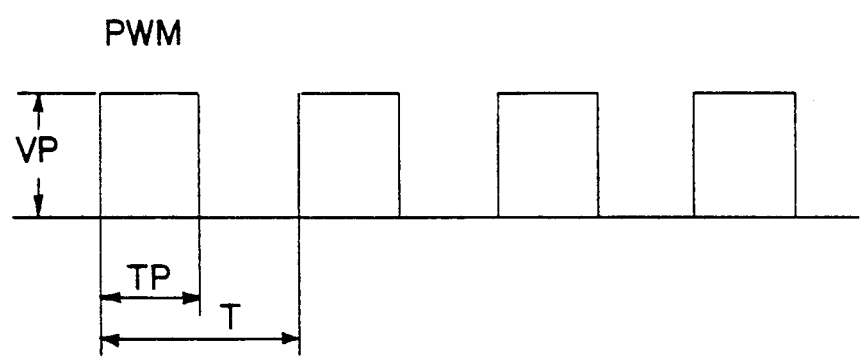
FIG. 4 is an explanatory view shoiwng a manner in which an applied voltage is determined in a PWM control.

When actuating the controller VR1 to set a certain voltage level, a corresponding level signal is inputted to the first analog-digital converting terminal A/D1 of the one-tip CPU (IC2) which will then output a PWM signal for setting a rotating speed of the motor to be dependent upon the level signal. To the second analog-digital converting terminal A/D2 of IC2 is inputted a voltage value divided between the resistors R2 and R3, which is converted into a corresponding digital value VP with a necessary data correction. In further reference to FIG. 4, this digital value VP is utilized to determine the applied voltage V in accordance with the following equation (4):

$$V = VP \times TP/T \quad (4)$$

where TP represents a pulse width and T a maximum pulse width, both being defined by time.

The rotating speed N of the DC motor is detected by the sensor 10 and then supplied to the input terminal P1 of IC2. As having been described, the applied voltage V and the motor rotating speed N constitute the state X of the DC motor, which is processed in the evaluator 1 to determine the current I and the power loss Plos of the DC motor in accordance with the equations (2) and (3) respectively. It should be noted that there is no need to directly measure the current I in the present control system, which makes it unnecessary to provide the resistor R5.

Although the invention has been described in conjunction with a specific embodiment thereof, it is to be understood that many variations and modifications may be made without departing from spirit and scope of the invention as defined in the appended claims.

What is claimed is:

1. An electronic sewing machine having upper and lower shaft driven by a DC motor mounted therein, which comprises means for detecting a voltage applied to the DC motor and a rotating speed of the DC motor; means for estimating from said detected values a power loss incurred in the DC motor and a current inputted to the DC motor; means for applying a predetermined fuzzy rule to said estimated values to determine if the DC motor operates with an excess of the rated loss; and display means for quantitatively representing the excess of the rated loss.

* * * * *